United States Patent [19]

Nonoyama

[11] Patent Number: 4,908,719
[45] Date of Patent: Mar. 13, 1990

[54] SCANNING APPARATUS WITH A MECHANISM TO SCAN BOTH SIDES OF AN ORIGINAL

[75] Inventor: Makoto Nonoyama, Yokohama, Japan

[73] Assignee: Kabushiki Kaisha Toshiba, Kawasaki, Japan

[21] Appl. No.: 281,564

[22] Filed: Dec. 8, 1988

[30] Foreign Application Priority Data

Dec. 26, 1987 [JP] Japan .................................. 62-330510
Dec. 26, 1987 [JP] Japan .................................. 62-330511

[51] Int. Cl.⁴ ........................ H04N 1/04; H04N 1/10; H04N 1/12
[52] U.S. Cl. ..................................... 358/494; 358/401; 358/448; 358/496; 358/497; 358/498
[58] Field of Search ................ 358/401, 408, 444, 448, 358/494, 496, 497, 498

[56] References Cited

U.S. PATENT DOCUMENTS

| | | |
|---|---|---|
| 4,429,333 | 1/1984 | Davis .................................. 358/496 |
| 4,499,500 | 2/1985 | Nagashima ........................... 358/448 |
| 4,571,636 | 2/1986 | Itoh ..................................... 358/498 |
| 4,657,376 | 4/1987 | Ide ...................................... 355/14 R |
| 4,743,974 | 5/1988 | Lockwood ........................... 358/494 |
| 4,839,740 | 6/1989 | Yoshida .............................. 358/448 |

*Primary Examiner*—Howard W. Britton
*Attorney, Agent, or Firm*—Finnegan, Henderson, Farabow, Garrett & Dunner

[57] ABSTRACT

An original table is provided on which an original is placed. This original on the original table is scanned by a first optical unit. A conveyance path, constituting an auto document feeder, is provided near the table, and one side of the original moving on the conveyance path is scanned by the first optical unit and the other side of the original is scanned by a second optical unit disposed near the first optical unit. The scanned output of the first optical unit is stored in a memory which can delay its content by a time corresponding to the distance between the first and second optical units. The signal stored in this memory and the scanned output of the second optical unit are sequentially outputted.

16 Claims, 8 Drawing Sheets

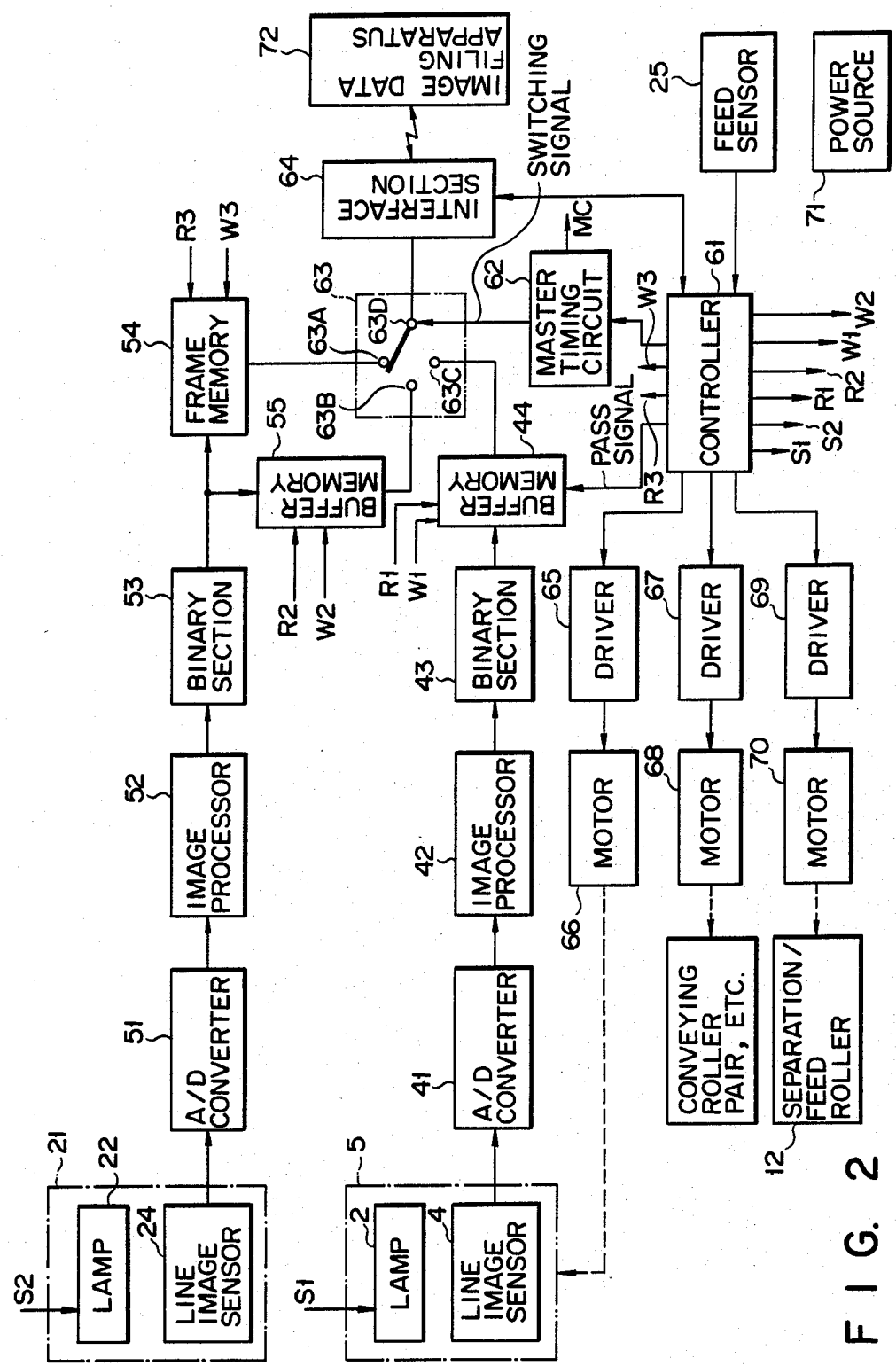
F I G. 2

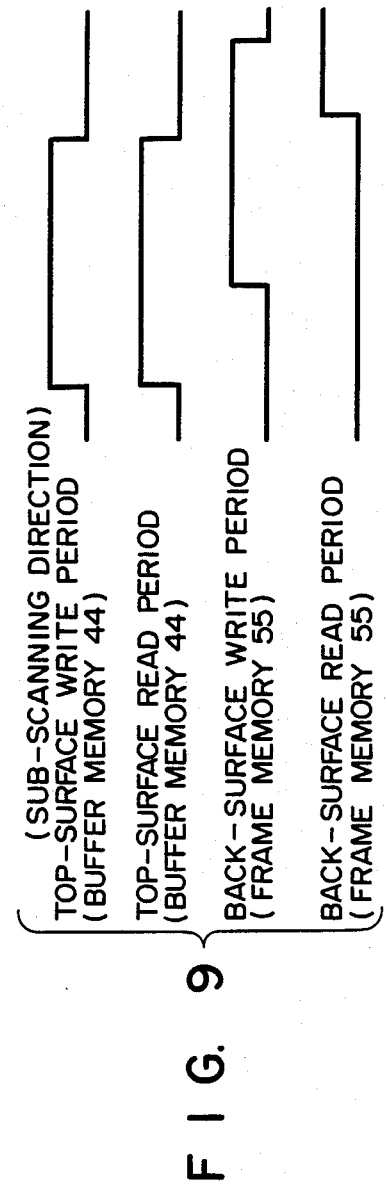
F I G. 9
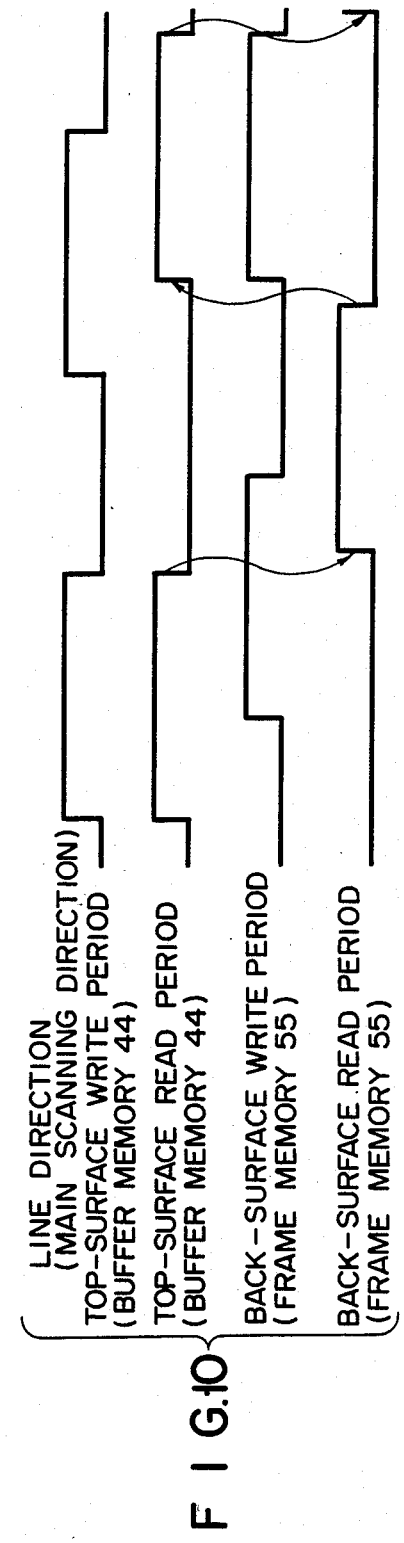
F I G. 10

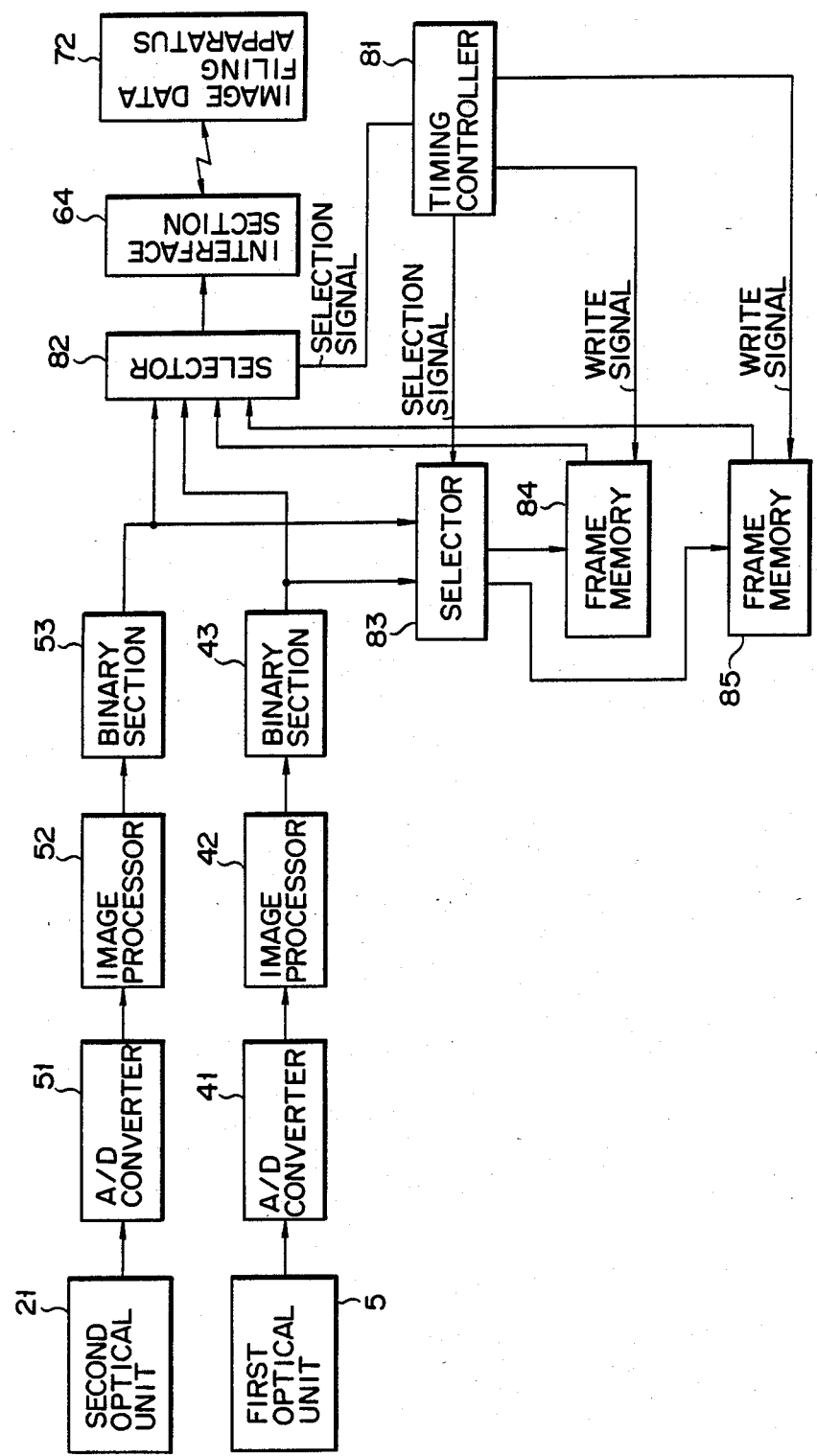
F I G. 11

SCANNING APPARATUS WITH A MECHANISM TO SCAN BOTH SIDES OF AN ORIGINAL

BACKGROUND OF THE INVENTION

1. Field of the Invention

The present invention relates to a scanning apparatus which is for use in, for example, an image data filing apparatus and has a mechanism to scan both sides of an original to be filed.

2. Description of the Related Art

An apparatus for optically scanning information, such as characters and graphics, illustrated on both sides of, for example, a sheet-shaped original is disclosed in U.S. Pat. No. 4,657,376. The apparatus includes a copying machine provided with an auto document feeder (ADF). With such a copying machine, an original is first set on an original table by the auto document feeder, then an image on one side of the original is exposed and scanned by an optical unit. The original set on the original table is then moved off the table by the document feeder and turned over by a flipping unit mounted on the feeder, and it is set again on the table. Information on the other side of the original is scanned by the optical unit.

In scanning images on both sides of the original with the above apparatus, after an image on one side of the original is scanned, scanning of an image on the other side is executed. Therefore, it takes time to scan the images of both sides of the original as well as to transfer the scanned images to succeeding units.

Further, the flipping unit used in the above apparatus to flip an original has a complicated structure and the original may be jammed in the flipping unit at the time it is flipped over.

SUMMARY OF THE INVENTION

It is the primary object of this invention to provide a scanning apparatus with a scanning mechanism which can scan images on both sides of an original in a short time and can transfer the scanned images with a high speed.

It is another object of this invention to provide a scanning apparatus with a scanning mechanism which can scan images on both sides of an original with a simple structure and can prevent an abnormal conveyance of the original.

According to one aspect of this invention, there is provided a scanning apparatus with a mechanism for scanning an original, which comprises:

means for conveying an original having first and second sides on which image data is recorded;

first scanning means for scanning the image data on the first side of the original moving on the conveyance means;

second scanning means, provided on an opposite side to the first scanning means with the conveyance means in between at a proximity of the first scanning means, for scanning the image data on the second side of the original moving on the conveyance means;

means for storing the image data scanned by the first scanning means; and means for sequentially outputting contents of the storage means and the image data scanned by the second scanning means.

According to another aspect of this invention, there is provided a scanning apparatus with a mechanism for scanning an original, which comprises:

means for conveying an original having first and second sides on which image data is recorded;

first scanning means for scanning the image data on the first side of the original moving on the conveyance means;

second scanning means for scanning the image data on the second side of the original moving on the conveyance means;

first storage means for storing the image data scanned by the first scanning means;

second storage means for storing the image data scanned by the second scanning means; and means for selectively outputting contents of the first and second storage means.

According to a further aspect of this invention, there is provided a scanning apparatus with a mechanism for scanning an original, which comprises:

an original table on which a first original is placed;

means, located on near the original table, for conveying a second original having first and second sides on which image data is recorded;

first scanning means, movable along the original table, for scanning image data on the first original and for scanning the image data on the first side of the second original moving on the conveyance means after moved near the conveyance means;

second scanning means, provided on an opposite side to the first scanning means with the conveyance means in between at a proximity of the first scanning means, for scanning image data on the second side of the second original moving on the conveyance means;

means for storing the image data scanned by the first scanning means; and means for selectively outputting contents of the storage means and the image data scanned by the second scanning means.

BRIEF DESCRIPTION OF THE DRAWINGS

FIG. 2 is a schematic block diagram illustrating the general structure of the first embodiment;

FIG. 9 is a timing chart for explaining write and read timings for each memory with respect to a subscanning direction;

FIG. 10 is a timing chart for explaining write and read timings for each memory with respect to a main scanning direction;

FIG. 11 is a block diagram of an essential section for explaining the second embodiment of this invention.

DETAILED DESCRIPTION OF THE PREFERRED EMBODIMENTS

Figure 1:
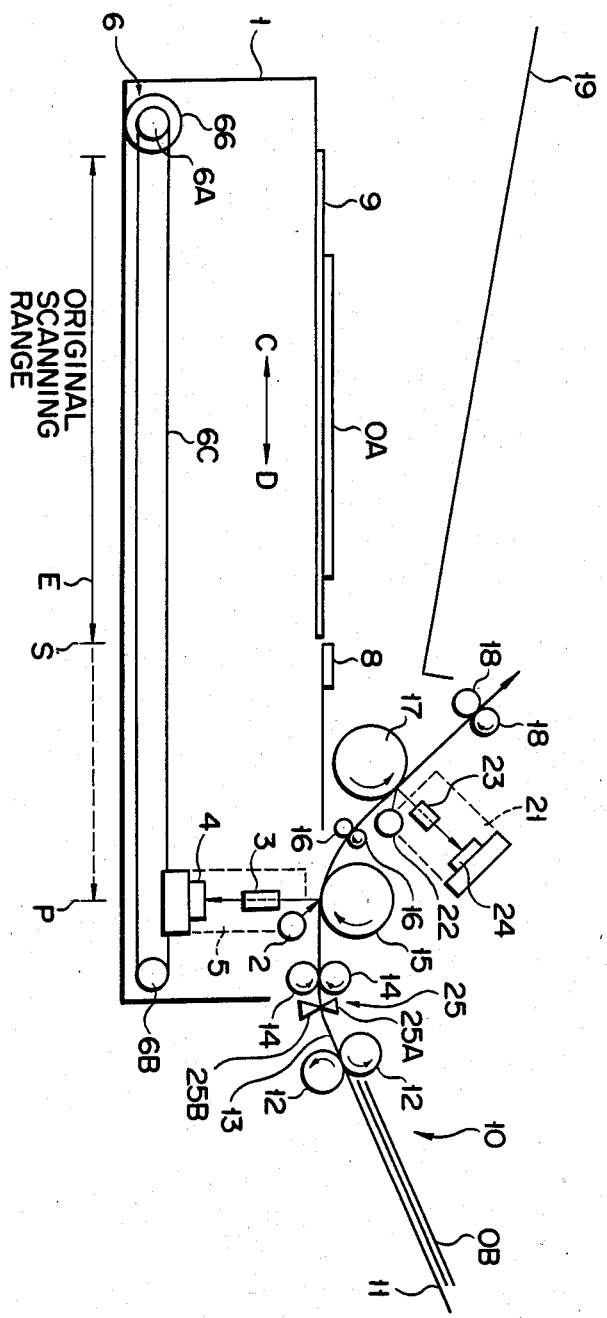
FIG. 1 is a diagram illustrating the general structure of the first embodiment of this invention.

In FIG. 1, on the top of a main body 1 is provided an original table (transparent glass) 9 on which an original OA such as a book is placed. This original table 9 is provided at its one side with a scale 8 for indicating the position of original OA. Original OA is scanned by a first optical unit 5, which comprises an exposure lamp 2 for irradiating light on original OA, a lens 3 for guiding the reflection light from original OA to a line image sensor 4 and this line image sensor 4 for photoelectrically converts the light led by the lens 3. For example, a light focusing lens serves as lens 3.

Optical unit 5 is moved by a moving unit 6 which comprises pulleys 6A and 6B provided on the respective sides of moving unit 6 along the moving direction, a timing belt 6C, spanning over the pulleys 6A and 6B and fixed to first optical unit 5, and a motor 66 for driving pulley 6B. First optical unit 5 is moved by the moving unit 6 in the directions of the arrows C and D within the original scanning range of original table 9, and is moved to position P facing a first platen roller 15 that is one component of an auto document feeder (ADF) 10 to be described later.

The ADF 10 is provided on main body 1 and near scale 8. In ADF 10, a plurality of originals OB can be disposed on a feed tray 11 and they are fed one by one separated by a pair of separation/feed rollers 12. One original OB separated by this separation/feed roller pair 12 is guided to a conveyance path 13. A pair of first conveying rollers 14, a first platen roller 15, a pair of second conveying rollers 16, a second platen roller 17 and a pair of discharge rollers 18 are sequentially provided along conveyance path 13 with predetermined intervals therebetween. The original OB on conveyance path 13 is discharged onto a discharge tray 19 by these first conveying roller pair 14, first platen roller 15, second conveying roller pair 16, second platen roller 17 and discharge roller pair 18.

The aforementioned optical unit 5 is moved to face first platen roller 15 with conveyance path 13 therebetween.

A second optical unit 21 is disposed and fixed to face second platen roller 17 with conveyance path 13 therebetween.

Second optical unit 21 comprises an exposure lamp 22 for irradiating light on original OB conveyed on conveyance path 13, a lens 23 of a light focusing type, which leads the reflection light from original OB to a line image sensor 24, and the line image sensor 24 for photoelectrically converts the light led by lens 23.

A feed sensor 25 for detecting the feeding of an original is provided on conveyance path 13 between separation/feed roller pair 12 and first conveying roller pair 14. This feed sensor 25 comprises a light emitting element 25A and a light receiving element 25B which face each other with conveyance path 13 in between.

With the above arrangement, when original OB is conveyed on conveyance path 13, it is scanned by second optical unit 21. More specifically, when original OB moving on conveyance path 13 comes to the position where second platen roller 17 is located, exposure lamp 22 is lit, and the reflection light from original OB is guided to line image sensor 24 by lens 23, thereby forming an image of original OB on the sensor 24. Line image sensor 24 in turn produces an electric signal corresponding to the formed image and sends the signal to an A/D (analog-to-digital) converter 51 which will be described later.

Figure 5:
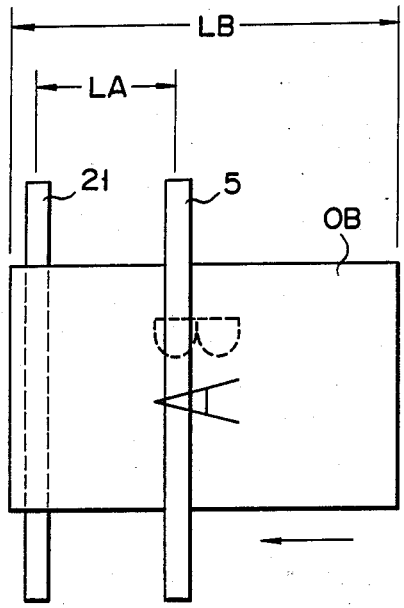

As shown in FIG. 5, therefore, one side (top surface) of original OB conveyed on conveyance path 13 is scanned by first optical unit 5, and the other side (back surface) of original OB is scanned by second optical unit 21.

Figure 6:
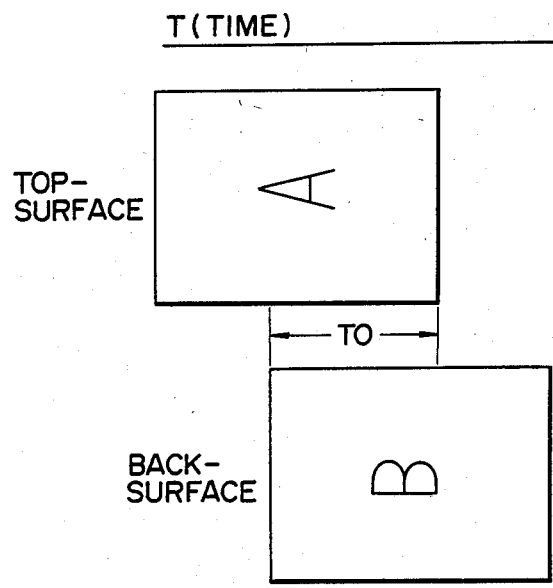

The distance LA between first and second optical units 5 and 21 is set shorter than the length LB of original OB. As shown in FIG. 6, therefore, there exists an overlap period TO in which the top surface of original OB is being scanned by first optical unit 5 while the back surface of the original is being scanned by second optical unit 21.

FIG. 2 illustrates an electric circuit, and uses the same reference numerals as those used in FIG. 1 to denote identical sections.

The output of line image sensor 4, a constituent of first optical unit 5, is supplied to A/D converter 41. A/D converter 41 amplifies the received signal and converts it to a digital signal which is in turn supplied to an image processor 42. This image processor 42 executes the shading compensation, edge emphasis, etc. and sends its output signal to a binary section 43. This binary section 43 converts the received signal into a binary (black/white) signal which is supplied to a buffer memory 44. Buffer memory 44 stores plural lines of signals supplied from binary section 43; the stored signals are supplied to a third input terminal 63C of a switch circuit 63.

Buffer memory 44 delays the readout of the stored signals to compensate the distance between the top-surface scanning start point of original OB and the back-surface scanning start point. Upon reception of a pass signal from a controller 61 (which will be described later), buffer memory 44 does not execute the compensation and supplies the stored signals directly to input terminal 63C of switch circuit 63.

The output of line image sensor 24, a constituent of second optical unit 21, is supplied to A/D converter 51. A/D converter 51 amplifies the received signal and converts it to a digital signal which is in turn supplied to an image processor 52. This image processor 52 executes the shading compensation, edge emphasis, etc. and sends its output signal to a binary section 53. This binary section 53 converts the received signal into a binary (black/white) signal which is supplied to a frame memory 54 and a buffer memory 55. Frame memory 54 stores one page of image signals supplied from binary section 53; the stored signals are supplied to a first input terminal 63A of the aforementioned switch circuit 63. Buffer memory 55 serves as a first-in-first-out circuit and its stored data is supplied to a second input terminal 63B of switch circuit 63.

Controller 61 performs the general control of the present apparatus in accordance with a master clock signal MC from a master timing circuit 62. Controller 61 controls a driver 65 to drive motor 66 that moves first optical unit 5. Controller 61 also controls a driver 69 to drive a motor 70 that rotates the aforementioned separation/feed roller pair 12, and controls a driver 67 to drive a motor 68 that rotates the individual roller pairs 14, 16 and 18 and platen rollers 15 and 17 located along conveyance path 13. Further, controller 61 controls the activation of exposure lamp 2 of first optical unit 5 to scan an original set on original table 9, and controls the activation of exposure lamps 2 and 22 of first and second optical units 5 and 21 to scan the original using ADF 10 in accordance with the output signal of feed sensor 25. S1 and S2 in FIG. 2 are light control signals. In addition, controller 61 executes the write/read control of buffer memories 44 and 55 and frame memory 54. W1 to W3 are write control signals and R1 to R3 are read control signals.

An interface section 64 couples a host computer, for example, an image data filing apparatus 72, to controller 61 and switch circuit 63, and supplies the signal from an output terminal 63D of switch 63 or the control signals from controller 61 to image data filing apparatus 42, and supplies a control signal from the apparatus 72 to controller 61.

Motors 66, 68 and 70 are pulse motors.

A source voltage from a power source 71 is applied to the above electric circuit.

The operation of thus constructed apparatus will now be described.

With original OA such as a book placed on original table 9, when a command to scan the original by first optical unit 5 on the side of original table 9 is given to controller 61 from image data filing apparatus 72 through interface section 64, controller 61 controls driver 65 to rotate motor 66 to thereby move first optical unit 5 from the initial position S in the direction A (see FIG. 1). Moving first optical unit 5, original OA to light and scan it. The reflection light from original OA is led through lens 3 to line image sensor 4.

This line image sensor 4 converts the received light into an electric signal and sends it to A/D converter 41. A/D converter 41 amplifies the received electric signal, converts it to a digital signal and sends the digital signal to image processor 42. Image processor 42 executes a signal processing, such as the shading compensation ad edge emphasis on the received signal and sends the resultant signal to binary section 43. Binary section 43 converts the received signal into a binary (black/white) signal and sends it to buffer memory 44.

A binary signal or an image signal of one line, stored in buffer memory 44 is supplied to image data filing apparatus 72 through switch circuit 63 and interface section 64. In other words, as buffer memory 44 is supplied with the pass signal from controller 61, it outputs the received image signal to switch circuit 63 without performing the compensation.

Every time one-line scanning is executed with respect to the original scanning range E, an image signal of one line is supplied to image data filing apparatus 72.

Figure 3:
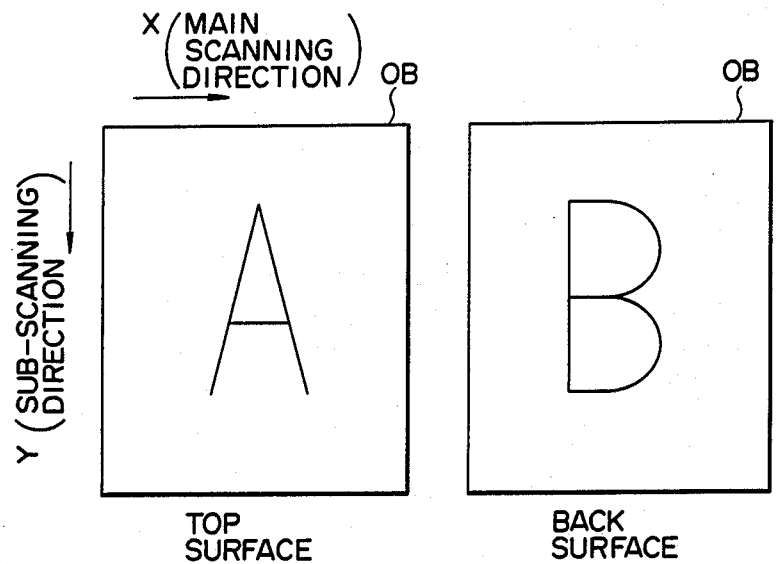
FIG. 3 is a diagram exemplifying data on an original.

Now, with original OB having an image on either side as shown in FIG. 3, being placed on feed tray 11, when a command to scan both sides of the original using ADF 10 is given through interface section to controller 61 from image data filing apparatus 72, controller 61 controls driver 65 to rotate motor 66. And, first optical unit 5 is moved from the initial position S in the direction B (see FIG. 1) and is stopped at position P where it faces first platen roller 15.

In this state, controller 61 controls drivers 67 and 69 to drive motors 68 and 70 whereby the individual conveying roller pairs 14, 16 and 18 and first and second platen rollers 15 and 17 as well as separation/feed roller pair 12. As a result, original OB is fed on conveyance path 13 from feed tray 11. When original OB faces first platen roller 15, its top surface is scanned by first optical unit 5 and when original OB faces second platen roller 17, following that event, its back surface is scanned by second optical unit 21.

Figures 7, 8:
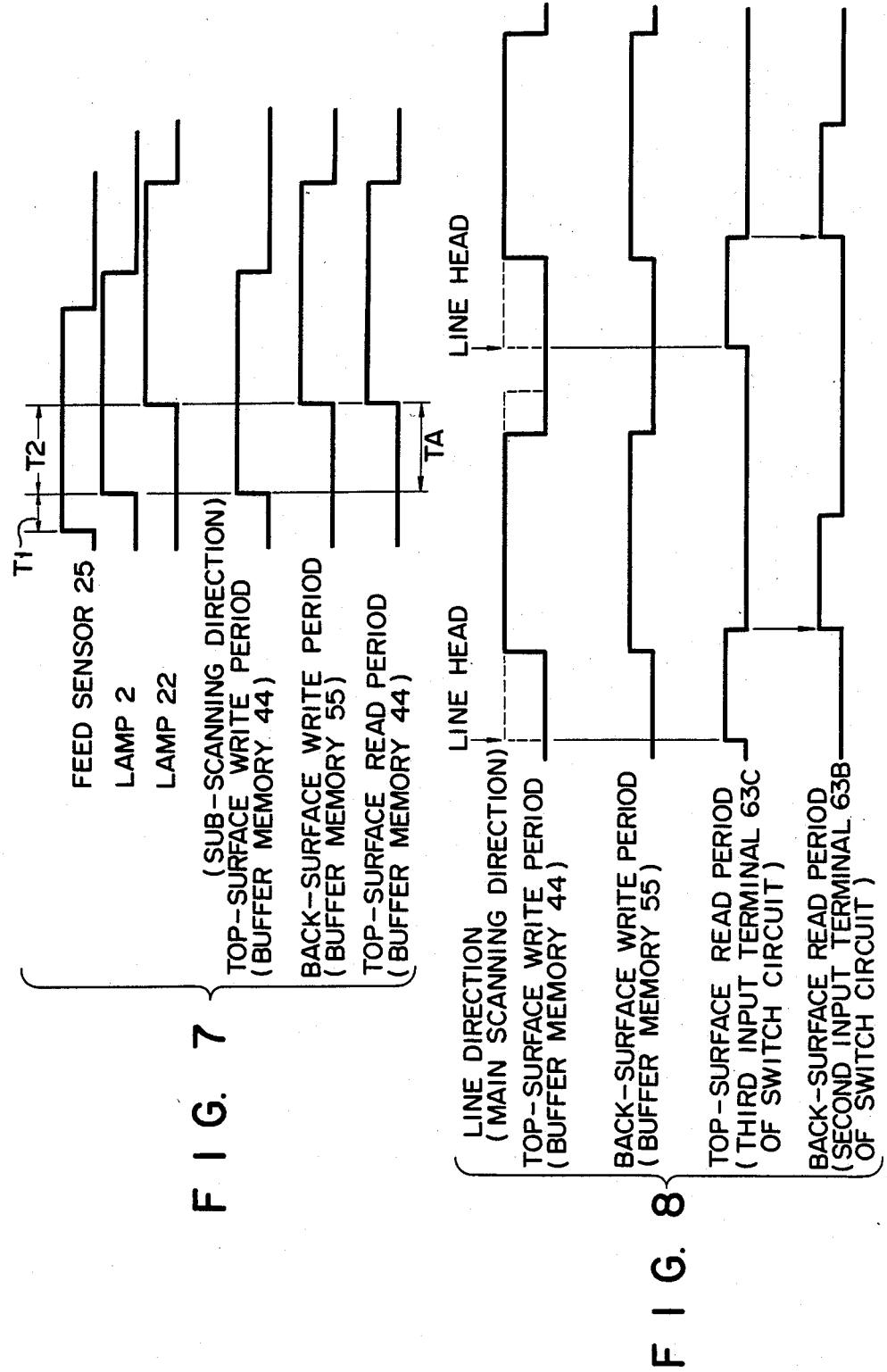
FIG. 7 is a timing chart for explaining write and read timings for each memory with respect to a subscanning direction.
FIG. 8 is a timing chart for explaining write and read timings for each memory with respect to a main scanning direction.

In other words, as shown in FIG. 7, when a given time (T1) elapses after the fore end of original OB has been detected by feed sensor 25, that is, when the original faces first platen roller 15, controller 61 turns on exposure lamp 2 and permits line image sensor 4 to scan the top surface image of original OB.

The photoelectrically-converted output of line image sensor 4 is stored in buffer memory 44 sequentially passing through A/D converter 41, image processor 42 and binary section 43.

When a given time (T2) elapses after the fore end of original OB has been detected by feed sensor 25, that is, when the original faces second platen roller 17, controller 61 turns on exposure lamp 22 and permits line image sensor 24 to scan the back surface image of original OB.

The photoelectrically-converted output of line image sensor 24 is stored in frame memory 54 and buffer memory 55 sequentially passing through A/D converter 51, image processor 52 and binary section 53.

When an image signal of the first line for the back surface image of original OB is stored in buffer memory 55, an image signal of the first line for the top surface image of the original, which has been stored in memory 44 is supplied to third input terminal 63C of switch circuit 63. In other words, the binary signal or image signal of one line stored in buffer memory 44 is supplied to third input terminal 63C of switch circuit 63 upon elapse of a delay time TA corresponding to the time during which original OB is conveyed from the scanning position of first optical unit 5 to the scanning position of second optical unit 21.

Switch circuit 63 has its output terminal 63D first coupled to input terminal 63C in response to a switching signal from master timing circuit 62, so that the image signal of one line for the top surface image of original OB, which is read out from buffer memory 44, is transferred to image data filing apparatus 72 through switch circuit 63 and interface section 64. Then, switch circuit 3 has its output terminal 63D coupled to input terminal 63B in response to a switching signal from master timing circuit 62, so that the image signal of one line for the back surface image of original OB from buffer memory 55 is transferred to image data filing apparatus 72 through switch circuit 63 and interface section 64.

Similarly, image signals of the remaining lines of the top and back surface images of original OB are sequentially supplied to image data filing apparatus 72 through switch circuit 63 and interface section 64.

Figure 4:
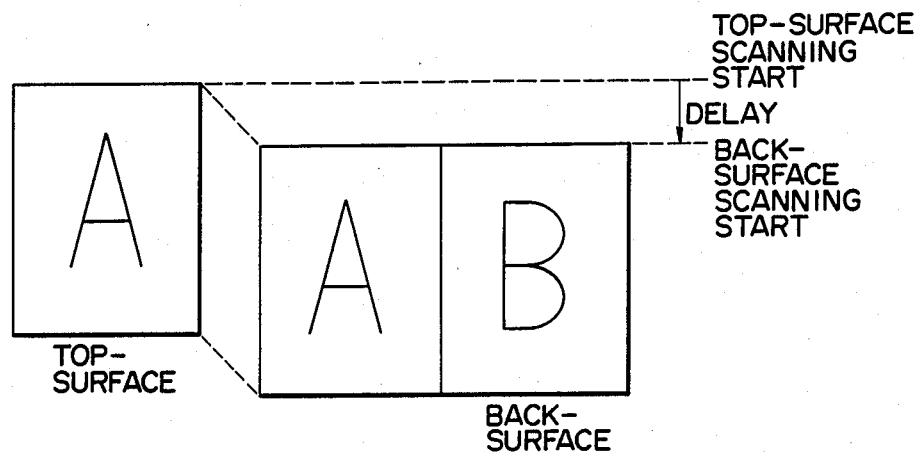
FIGS. 4 through 6 are diagrams for explaining the timings for scanning top and back surfaces of an original.

Consequently, as shown in FIG. 4, the top surface image and back surface image of original OB are transferred to image data filing apparatus 72 side by side; if the size of original OB is A4, the output image data would have the size of A3 twice the size of A4.

The time required for reading a signal of one line from buffer memories 44 and 55 is a half the time required for writing the signal into these memories, and the signal read speed for memories 44 and 55 is twice faster than the signal write speed (see FIG. 8). Therefore, the top and back surface images of original OB can be transferred to image data filing apparatus 72 in a time required for transferring one surface image.

Although the above description of the embodiment has been given with reference to the case where image signals of both surface images are aligned sequential in the line direction and transferred side by side, this invention is not limited to this particular case. The top surface image and back surface image may be separately transferred instead.

For instance, a pass signal is supplied to buffer memory 44 from controller 61 so as to inhibit the delay operation of buffer memory 44. In this state, an image signal of one line as scanned from the top surface of original OB is supplied as it is to third input terminal 63C of switch circuit 63 without delay in buffer memory 44. Accordingly, the top surface image of original OB is transferred line by line to image data filing apparatus 72 through interface section 64.

Meanwhile, the back surface image of original OB scanned by second optical unit 21 is sequentially stored in frame memory 54 line by line. Consequently, the back surface image of original OB stored in frame memory 55 can be transferred to image data filing apparatus 72 line by line through interface section 64 by coupling output terminal 63D and input terminal 63A of switch circuit 63 in accordance with the switching signal which is supplied from master timing circuit 62 after the transfer of the top surface image of original OB is completed (see FIG. 9). As a result, the top and back surface images of original OB are outputted as separate images. In this case, the same operation can be executed without using buffer memory 44.

In separately outputting the top and back surface images of original OB, given that the image signal of one line for the top surface image is stored in buffer memory 44 and the image signal of one line for the back surface image is stored in buffer memory 55, image signals of one line may be sequentially and selectively transferred as shown in FIG. 10.

As described above, first and second optical units 5 and 21 respectively for scanning the top and back surface images of an original are provided on the respective sides with conveyance path 13 in between, there by ensuring the scanning of both sides of the original in a single conveying action. This can simplify the original feeder as well as can prevent generation of an abnormal conveyance such as paper jamming due to easier original conveying operation.

In addition, the use of buffer memory 44 can set the overlap period in which the top and back surface images of the original can be simultaneously performed. This can shorten conveyance path 13 and can simplify the overall apparatus as a consequence.

Further, since the top and back surface images of the original can be transferred to the image data filing apparatus side by side, these images can be processed and displayed as a single image in a case where the image data filing apparatus serves as a host computer. This feature is practically convenient.

The second embodiment of this invention will now be described.

In the above embodiment, buffer memory 44 is used to control the timings for transferring image signals scanned from the top and back surfaces of an original. However, a selector may be provided in place of such a memory to control the signal transfer timings.

FIG. 11 illustrates an example of the modification. For those components identical to those shown in FIG. 2, the same numerals are used here, so that only the differences will be explained below.

An image signal from binary section 43 is stored in a frame memory 84 through a selector 83, and an image signal from binary section 53 is stored in a frame memory 85 also through selector 83. The image signals from binary sections 43 and 53 are also supplied to a selector 82 which selectively sends them to interface section 64. The selectors 82 and 83 are controlled by a selection signal from a timing controller 81, and the write access to frame memories 84 and 85 is controlled by a write signal also from timing controller 81.

With the above arrangement, even if both sides of an original are almost simultaneously scanned by first and second optical units 5 and 21, the signal output timings can be controlled by writing the image signal of the top surface of the original in frame memory 84 through selector 83 and writing the image signal of the back surface of the original in frame memory 85 through selector 83.

For instance, in scanning the back surface image of the original by means of second optical unit 21 while the top surface image of the original is being scanned by first optical unit 5, image signals can be transferred to image data filing apparatus 72 as per the ordinary scanning of only one surface of the original by temporarily storing the image signal outputted from second optical unit 21 in frame memory 85 and transferring the image signal of the back surface image stored in frame memory 85 to the apparatus 72 after the image signal of the top surface image stored in frame memory 84 is transferred to apparatus 72.

A description is now given of the third embodiment of this invention.

In the first and second embodiments, the output signals of line image sensors 4 and 24 are supplied to A/D converters 41 and 51 for their digitalization and the digital signals are then subjected to the image processing and binary operation. The output signals of the line image sensors may be subjected to image processing without prior conversion to digital signals.

Figure 12:
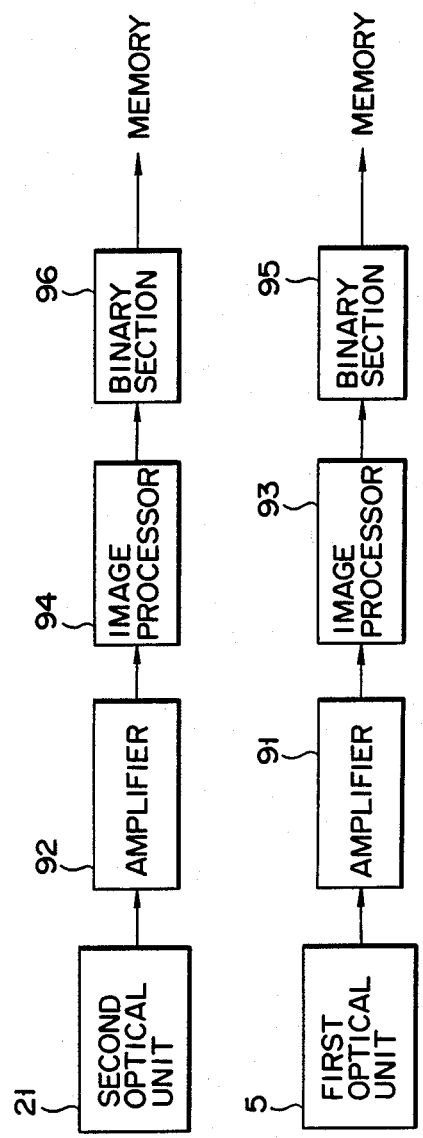
FIG. 12 is a block diagram of an essential section for explaining the third embodiment of this invention.

FIG. 12 illustrates an example of the modification.

The output signals of first and second optical units 5 and 21 are respectively supplied to amplifiers 91 and 92 whose output signals are in turn supplied to image processors 93 and 94, respectively. These image processors 93 and 94 subject the received signals in analog form to shading compensation, edge emphasis, etc., and their output signals are supplied to binary sections 95 and 96 for conversion into binary (black/white) signals. The binary signals are stored in their respective memories.

This third arrangement can produce the same effects as the first and second embodiments.

What is claimed is:

1. A scanning apparatus with a scanning mechanism for scanning an original, comprising:
    means for conveying an original having first and second sides on which image data is recorded;
    first scanning means for scanning the image data on the first side of said original moving on said conveyance means;
    second scanning means, provided on an opposite side to said first scanning means with said conveyance means in between at a proximity of said first scanning means, for scanning the image data on the second side of said original moving on said conveyance means;
    means for storing said image data scanned by said first scanning means; and
    means for sequentially outputting contents of said storage means and said image data scanned by said second scanning means.

2. The scanning apparatus according to claim 1, wherein said first and second scanning means each comprise a line image sensor for scanning said original line by line.

3. The scanning apparatus according to claim 1, wherein said first scanning means comprises a line image sensor for scanning said image data line by line, and said storage means comprises a memory for storing plural lines of a scanned output of said line image sensor.

4. The scanning apparatus according to claim 1, wherein said storage means comprises means for delaying data stored therein by a time corresponding to a distance between said first and second scanning means.

5. The scanning apparatus according to claim 1, wherein said storage means comprises a memory capable of delaying a signal stored therein and releasing a delay.

6. A scanning apparatus with a mechanism for scanning an original, comprising:
- means for conveying an original having first and second sides on which image data is recorded;
- first scanning means for scanning the image data on the first side of said original moving on said conveyance means;
- second scanning means for scanning the image data on the second side of said original moving on said conveyance means;
- first storage means for storing said image data scanned by said first scanning means;
- second storage means for storing said image data scanned by said second scanning means; and
- means for selectively outputting contents of said first and second storage means.

7. The scanning apparatus according to claim 6, wherein said first and second scanning means each comprise a line image sensor for scanning said image data line by line.

8. The scanning apparatus according to claim 6, wherein said first and second scanning means each comprise a line image sensor for scanning said image data line by line, and said first and second storage means each comprise a memory for storing plural lines of a scanned output of said line image sensor.

9. The scanning apparatus according to claim 6, wherein said second storage means has a memory capacity for one page of said original scanned by said second scanning means.

10. The scanning apparatus according to claim 6, wherein said first and second storage means further comprise means for controlling a data read speed so that it is faster than a data write speed.

11. The scanning apparatus according to claim 6, further comprising means for storing output signals of said first and second scanning means in said first and second storage means, respectively, and means for selecting output signals of said first and second scanning means and output signals of said first and second storage means.

12. A scanning apparatus with a mechanism for scanning an original, comprising:
- an original table on which a first original is placed;
- means, located on near said original table, for conveying a second original having first and second sides on which image data is recorded;
- first scanning means, movable along said original table, for scanning image data on said first original and for scanning the image data on the first side of said second original moving on said conveyance means after moved near said conveyance means;
- second scanning means, provided on an opposite side to said first scanning means with said conveyance means in between at a proximity of said first scanning means, for scanning image data on the second side of said second original moving on said conveyance means;
- means for storing said image data scanned by said first scanning means; and
- means for selectively outputting contents of said storage means and said image data scanned by said second scanning means.

13. The scanning apparatus according to claim 12, wherein said first and second scanning means each comprise a line image sensor for scanning said image data line by line.

14. The scanning apparatus according to claim 12, wherein said first scanning means comprises a line image sensor for scanning said image data line by line, and said storage means comprises a memory for storing plural lines of a scanned output of said line image sensor.

15. The scanning apparatus according to claim 13, wherein said storage means comprises means for delaying data stored therein by a time corresponding to a distance between said first and second scanning means.

16. The scanning apparatus according to claim 13, wherein said storage means comprises a memory capable of delaying a signal stored therein and releasing a delay.

* * * * *